United States Patent
Wang et al.

(10) Patent No.: US 12,403,608 B2
(45) Date of Patent: Sep. 2, 2025

(54) PICKUP ROBOT, PICKUP METHOD, AND COMPUTER-READABLE STORAGE MEDIUM

(71) Applicant: Beijing Geekplus Technology Co., Ltd., Beijing (CN)

(72) Inventors: Yingchun Wang, Beijing (CN); Chao Chen, Beijing (CN); Xiaoli Guo, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 551 days.

(21) Appl. No.: 17/634,906

(22) PCT Filed: Dec. 22, 2020

(86) PCT No.: PCT/CN2020/138291
§ 371 (c)(1),
(2) Date: Feb. 11, 2022

(87) PCT Pub. No.: WO2021/129608
PCT Pub. Date: Jul. 1, 2021

(65) Prior Publication Data
US 2022/0315337 A1    Oct. 6, 2022

(30) Foreign Application Priority Data
Dec. 26, 2019   (CN) .......................... 201911368940.5

(51) Int. Cl.
B25J 9/16    (2006.01)
B65G 1/137    (2006.01)
(Continued)

(52) U.S. Cl.
CPC .......... B25J 9/1697 (2013.01); B65G 1/1371 (2013.01); G06K 7/1417 (2013.01); G06T 7/11 (2017.01);
(Continued)

(58) Field of Classification Search
CPC ... B25J 9/1697; B65G 1/1371; G06K 7/1417; G06T 7/70; G06V 10/245; G06V 10/751
See application file for complete search history.

(56) References Cited

U.S. PATENT DOCUMENTS

| | | |
|---|---|---|
| 6,981,644 B2 | 1/2006 | Cheong et al. |
| 7,296,747 B2 * | 11/2007 | Rohs .................. H04N 1/32133 235/462.04 |

(Continued)

FOREIGN PATENT DOCUMENTS

| | | |
|---|---|---|
| CN | 104008361 A | 8/2014 |
| CN | 108182417 | 6/2018 |

(Continued)

OTHER PUBLICATIONS

International Search Report issued in International Application No. PCT/CN2020/138291 dated Mar. 3, 2021.
(Continued)

*Primary Examiner* — Ernesto A Suarez
*Assistant Examiner* — Laurence R Brothers
(74) *Attorney, Agent, or Firm* — Hodgson Russ LLP (57) ABSTRACT

The present disclosure provides a pickup robot, a pickup method, and a computer-readable storage medium. First, obtain a target image captured when a pickup component moves to each slot where a commodity is stored; then, when it is determined, on the basis of the slot identifier in the target image, that the current slot is a target slot which stores a commodity to be picked, screen a commodity identifier from the target image; when the commodity identifier is obtained
(Continued)

by means of screening, determine, on the basis of the commodity identifier, the position information of the commodity to be picked up in the target slot; finally, pick up, on the basis of the position information, said commodity from the target slot. In the technical solution above, the target slot where the commodity to be picked up is stored, and the position information of said commodity in the target slot can be accurately determined by using the slot identifier and the commodity identifier, and said commodity can be accurately picked up on the basis of the determined position information, thereby effectively improving the pickup success rate, and also helping to improve the logistics efficiency of logistics industry.

11 Claims, 3 Drawing Sheets

(51) Int. Cl.
    *G06K 7/14*         (2006.01)
    *G06Q 10/087*     (2023.01)
    *G06T 7/11*         (2017.01)
    *G06T 7/70*         (2017.01)
    *G06V 10/24*      (2022.01)
    *G06V 10/75*      (2022.01)
    *B25J 13/08*      (2006.01)
    *B25J 19/02*      (2006.01)
    *G06K 17/00*     (2006.01)
    *G06T 7/136*     (2017.01)

(52) U.S. Cl.
    CPC .............. *G06T 7/70* (2017.01); *G06V 10/245* (2022.01); *G06V 10/751* (2022.01); *G05B 2219/31028* (2013.01); *G05B 2219/45063* (2013.01); *G06Q 10/087* (2013.01)

(56) References Cited

U.S. PATENT DOCUMENTS

| | | | |
|---|---|---|---|
| 2001/0056313 | A1 | 12/2001 | Osborne, Jr. |
| 2007/0069026 | A1 | 3/2007 | Aoyama |
| 2008/0249663 | A1 | 10/2008 | Aoyama |
| 2017/0225891 | A1 | 8/2017 | Elazary et al. |
| 2017/0277927 | A1* | 9/2017 | Lin .................... G06K 7/10722 |
| 2018/0215544 | A1* | 8/2018 | High .................... G06K 7/1417 |
| 2019/0171220 | A1 | 6/2019 | Elazary et al. |
| 2019/0291277 | A1 | 9/2019 | Oleynik |
| 2019/0310655 | A1 | 10/2019 | Voorhies et al. |
| 2021/0287170 | A1 | 9/2021 | Al et al. |

FOREIGN PATENT DOCUMENTS

| | | | |
|---|---|---|---|
| CN | 109344928 | A | 2/2019 |
| CN | 109409218 | A | 3/2019 |
| CN | 109636269 | A | 4/2019 |
| CN | 110097304 | A | 8/2019 |
| CN | 110148257 | A | 8/2019 |
| JP | 2004-196439 | A | 7/2004 |
| JP | 2005-83984 | A | 3/2005 |
| JP | 2009-15684 | A | 1/2009 |
| JP | 2017-97622 | A | 6/2017 |
| JP | 2018-39668 | A | 3/2018 |
| JP | 2018-513822 | A | 5/2018 |
| JP | 2019-163172 | A | 9/2019 |
| KR | 10-2001-0113578 | A | 12/2001 |
| WO | 2018/140770 | A1 | 8/2018 |
| WO | 2019200012 | A1 | 10/2019 |

OTHER PUBLICATIONS

Office Action cited in related Chinese Application Serial No. 201911368940.5 dated Jan. 4, 2024.
Supplementary European Search Report and Search Opinion issued in related Application Serial No. 20907071.3 on Oct. 19, 2023.
Korean Office Action issued in Application Serial No. 10-2022-7007044 dated Feb. 28, 2024.
CNIPA, First Office Action for CN Application No. 202110430586.5, Dec. 29, 2023.
Japanese Notice of Record issued in Patent Application No. 2022-513882 on Mar. 28, 2023.
Australian Examination Report issued in Application No. 2020414142 on Feb. 3, 2023.

* cited by examiner

PICKUP ROBOT, PICKUP METHOD, AND COMPUTER-READABLE STORAGE MEDIUM

CROSS-REFERENCE TO RELATED APPLICATIONS

This application is a U.S. National Stage of International Patent Application No. PCT/CN2020/138291, filed 22 Dec. 2020, which claims priority to Chinese Patent Application No. 201911368940.5, filed on 26 Dec. 2019. The disclosures of which are incorporated herein by reference in their entirety.

FIELD

The present disclosure relates to the technical field of computer processing and computer software, and in particular to a pickup robot, a pickup method and a computer readable storage medium.

BACKGROUND

With the networking of shopping, higher requirements are imposed on the processing speed of logistics industries. A link in the logistics industry is picking up required goods from a warehouse, in which manual pickup is gradually replaced by robot pickup.

In an operation of pickup of a robot, the robot needs to travel to a position where a required goods is stored and accurately pick up the goods. In the conventional art, due to the defect in positioning, the failure rate of pickup is high, which reduces the efficiency of pickup and the logistics efficiency of the overall logistics industries.

SUMMARY

In view of this, a pickup robot, a pickup method, and a computer-readable storage medium are at least provided according to the present disclosure.

In a first aspect, a pickup robot is provided according to the present disclosure provides, which includes: a camera, a processor, and a pickup component. The processor includes an image processing module and a position determining module. The camera is configured to acquire a target image in a case that the pickup component travels to each slot where goods is stored, and the target image includes a slot identifier corresponding to a current slot. The image processing module is configured to filter goods identifier from the target image if it is determined, based on the slot identifier, that the current slot is a target slot for storing goods to be picked-up. The position determining module is configured to determine, in a case that the goods identifier is found, position information of a position of the goods to be picked-up in the target slot based on the goods identifier. The pickup component is configured to pick up, based on the position information, the goods to be picked-up from the target slot.

In a second aspect, a storage robot is provided according to the present disclosure provides, which includes: a camera, a processor, and a pickup component. The processor includes an image processing module and a position determining module. The camera is configured to acquire a target image in a case that a pickup component travels to a target slot where goods is stored. The image processing module is configured to filter goods identifier from the target image. The position determining module is configured to determine, in a case that the goods identifier is found, position information of a position of goods to be picked-up in the target slot based on the goods identifier. The pickup component is configured to pick up, based on the position information, the goods to be picked-up from the target slot.

In a third aspect, a storage robot is provided according to the present disclosure provides, which includes: a camera, a processor, and a pickup component. The processor includes an image processing module and a position determining module. The camera is configured to acquire a target image in a case that the storage robot travels to a target slot where goods is to be stored. The image processing module is configured to filter a slot identifier from the target image. The position determining module is configured to determine position information of a position of the goods to be stored in the target slot based on a position of the slot identifier in the target image. The storage component is configured to store the goods to be stored in the target slot based on the position information.

In a fourth aspect, a pickup method is provided according to the present disclosure provides, which includes:
acquiring a target image in a case that the pickup component travels to each slot where goods is stored, where the target image includes a slot identifier corresponding to a current slot;
searching for goods identifier from the target image if it is determined, based on the slot identifier, that the current slot is a target slot for storing goods to be picked-up;
determining, in a case that the goods identifier is found, position information of a position of the goods to be picked-up in the target slot based on the goods identifier; and
picking up, based on the position information, the goods to be picked-up from the target slot.

In a fourth aspect, a pickup method is provided according to the present disclosure provides, which includes:
acquiring a target image in a case that a pickup component travels to a target slot where goods is stored;
searching for goods identifier from the target image;
determining, in a case that the goods identifier is found, position information of a position of goods to be picked-up in the target slot based on the goods identifier; and
picking up, based on the position information, the goods to be picked-up from the target slot.

In a fifth aspect, a storage method is provided according to the present disclosure provides, which includes:
acquiring a target image in a case that a storage robot travels to a target slot where goods is to be stored;
searching for a slot identifier from the target image;
determining position information of a position of the goods to be stored in the target slot based on a position of the slot identifier in the target image; and
storing the goods to be stored in the target slot based on the position information.

In a sixth aspect, a computer-readable storage medium storing a computer program is provided according to the present disclosure, where the computer program, when is run by a processor, executes the steps of the above pickup method or storage method.

A pickup robot, a pickup method, and a computer-readable storage medium are provided according to the present disclosure. First, a target image is acquired in a case that the pickup component travels to each slot where goods is stored. Then, goods identifier is searched for from the target image if it is determined that the current slot is a target slot for storing goods to be picked-up based on the slot identifier. In a case that the goods identifier is found, position information of a position of the goods to be picked-up in the target slot is determined based on the goods identifier. Finally, the goods to be picked-up is picked up from the target slot based on the position information. With the above technical solution, the target slot where the goods to be picked-up is stored and the position information of the position of the goods to be picked-up in the target slot can be accurately determined based on the slot identifier and the goods identifier, and the goods to be picked-up can be accurately picked-up based on the determined position information, thereby effectively improving the success rate of pickup, thus facilitating improvement of the logistics efficiency of the logistics industries.

BRIEF DESCRIPTION OF THE DRAWINGS

In order to explain the technical solutions of the embodiments of the present disclosure more clearly, drawings used in description of the embodiments are briefly described in the following. It should be understood that the drawings only show some embodiments of the present disclosure, and therefore should be regarded as a limitation of the scope. For those skilled in the art, other related drawings may be obtained based on these drawings without creative work.

DETAILED DESCRIPTION OF EMBODIMENTS

In order to make the purpose, technical solutions and advantages of the embodiments of the present disclosure clearer, the technical solutions of the embodiments of the present disclosure will be clearly and completely described in conjunction with the drawings in the embodiments of the present disclosure in the following. It should be understood that the drawings in the present disclosure are used only for the purpose of illustration and description, and are not intended to limit the protection scope of the present disclosure. In addition, it should be understood that the schematic drawings are not drawn to scale. The flowchart used in the present disclosure shows operations implemented according to some embodiments of the present disclosure. It should be understood that the operations of the flowchart may be implemented in another order, and steps without logical context may be implemented in a reverse order or implemented simultaneously. In addition, under the guidance of the content of the present disclosure, those skilled in the art can add one or more other operations to the flowchart, or remove one or more operations from the flowchart.

In addition, the described embodiments are only some of the embodiments of the present disclosure, rather than all the embodiments. The components of the embodiments of the present disclosure generally described and shown in the drawings herein may be arranged and designed in various different configurations. Therefore, the following detailed description of the embodiments of the present disclosure provided in the drawings is not intended to limit the claimed scope of the present disclosure, but merely represents preferred embodiments of the present disclosure. Based on the embodiments of the present disclosure, all other embodiments obtained by those skilled in the art without creative work shall fall within the protection scope of the present disclosure.

It should be noted that the term "including" will be used in the embodiments of the present disclosure to indicate the existence of the features described thereafter, but this does not exclude the addition of other features.

At present, in the logistics industries, in the process of picking up goods from warehouses by using robots, due to the defects in positioning, there is a low success rate of pickup. In view of this, a pickup robot, a pickup method, and a computer readable storage medium are provided according to the present disclosure. In the present disclosure, the target slot where the goods to be picked-up is stored and the position information of the position of the goods to be picked-up in the target slot can be accurately determined based on the slot identifier and the goods identifier, and the goods to be picked-up can be picked up accurately based on the determined position information, thereby effectively improving the success rate of pickup, thus facilitating improvement of the logistics efficiency of the logistics industries.

Figure 1:
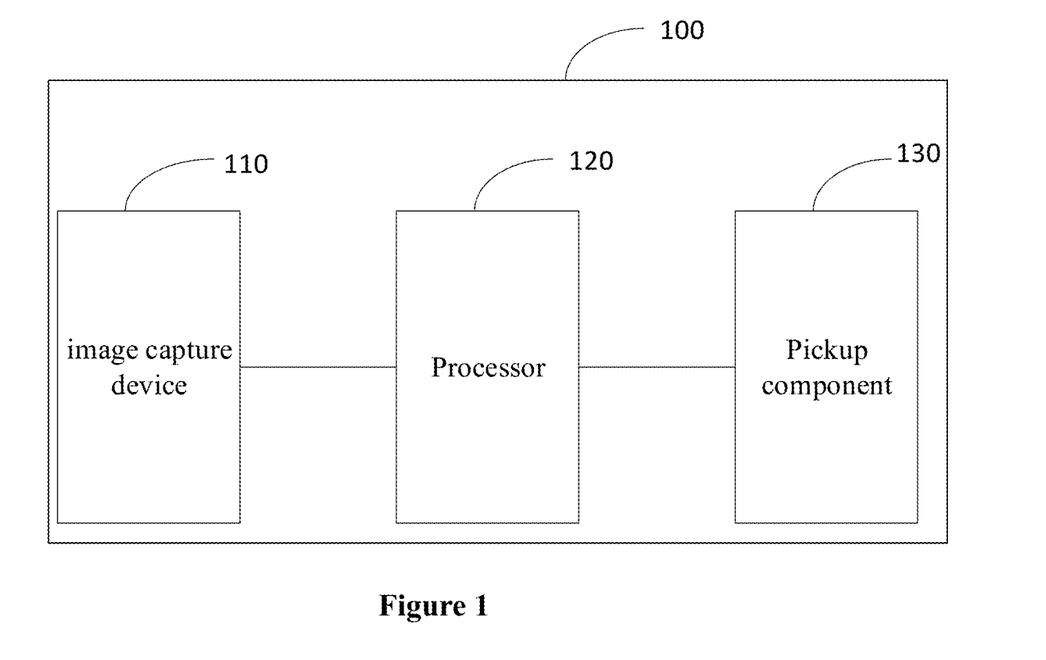
FIG. 1 shows a schematic structural diagram of a pickup robot according to an embodiment of the present disclosure.

Specifically, a pickup robot 100 is provided according to an embodiment of the present disclosure. As shown in FIG. 1, the pickup robot 100 includes: an image capture device 110, a processor 120, and a pickup component 130. The processor 120 includes an image processing module and a position determining module. The image capture device 110 is configured to acquire a target image in a case that the pickup component 130 travels to each slot where goods is stored. The target image includes a slot identifier corresponding to a current slot. The image processing module is configured to filter goods identifier from the target image if it is determined, based on the slot identifier, that the current slot is the target slot for storing the goods to be picked-up. The position determining module is configured to determine position information of a position of the goods to be picked-up in the target slot based on the goods identifier in a case that the goods identifier is found. The pickup component 130 is configured to pick up the goods to be picked-up from the target slot based on the position information.

The image capture device 110 acquires an image in a preset time interval. The above target image is an image acquired in a case that the pickup robot 100 or the pickup component of the pickup robot 100 travels to the slot where the goods is stored. The image includes a slot identifier corresponding to the slot.

The above slot is used to store goods and the slot identifier may be arranged at a lower part of each slot, such as a lower beam of the slot. The slot identifier is used to identify the corresponding slot, for example, identify an ID number of the slot. In an implementation, the above slot identifier may be set as a two-dimensional code or the like.

After the image capture device 110 of the pickup robot 100 acquires the target image including the slot identifier, and before the image processing module searches for the goods identifier from the target image, the pickup robot 100 needs to extract the slot identifier from the target image by using the image processing module, and parse the extracted slot identifier to obtain identification information of the slot. Then, the image processing module needs to acquire the identification information of the target slot where the goods to be picked-up is stored, and determine whether the identification information of the target slot is the same as the identification information of the slot in the target image. If the identification information of the target slot is the same as the identification information of the slot in the target image, it means that the slot in the target image is the target slot where the goods to be picked-up is stored, if the identification information of the target slot is different from the identification information of the slot in the target image, the slot in the target image is not the target slot where the goods to be picked-up is stored, and the robot needs to travel continually.

In a case that the image processing module of the pickup robot 100 determines that the slot in the target image is the target slot for storing the goods to be picked-up, the step of searching for the goods identifier from the target image is performed.

The image processing module extracts the slot identifier from the target image, that is, the image processing module determines the position information of the position of the slot identifier in the target image. In an implementation, the image processing module may determine the position information of the slot identifier in the target image in the following steps 1 to 4.

In step 1, binarization processing is performed on the target image, and pixels with a preset gray value are extracted from an image obtained by the binarization processing.

The image processing module performs binarization processing on the target image to obtain a binarized image.

Figure 2:
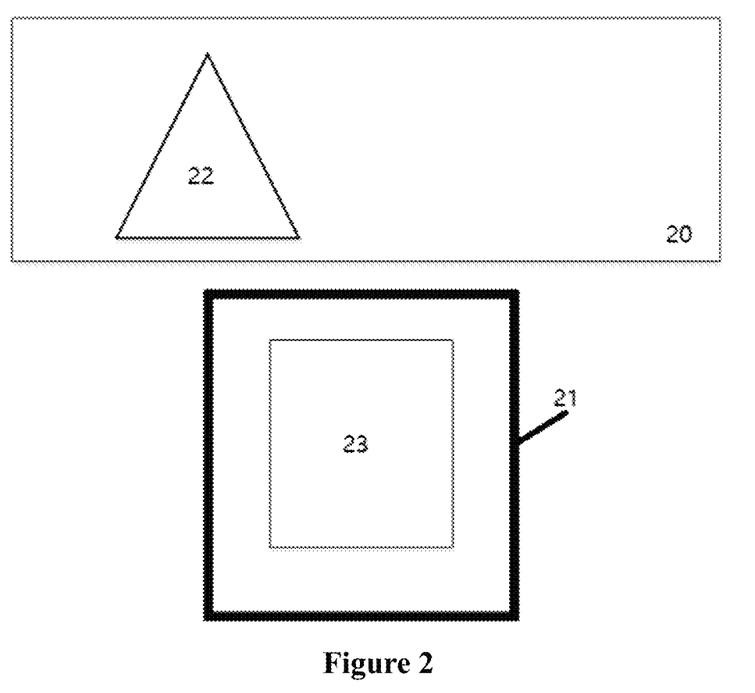
FIG. 2 shows a schematic diagram of a target image in an embodiment of the present disclosure.

In a case that the binarized image is obtained, the pixels with the preset gray value are extracted from the binarized image, that is, the pixels of a position identifier for positioning the slot identifier 23 are extracted. As shown in FIG. 2, in an implementation, if the position identifier of the slot identifier 23 is represented by a black frame 21 with a certain width, the image processing module 1201 extracts black pixels in this step.

In step 2, based on the extracted pixels, fitting is performed to obtain a candidate position identifier of the slot identifier.

In a case that the image processing module extracts the pixels of the position identifier, fitting is performed to obtain straight lines so as to obtain a black frame with a certain width. The black frame obtained in this step indicates a candidate position identifier, and further verification is required to determine whether the black frame is the target position identifier used to locate the slot identifier. The intersection of the fitted straight lines is a corner point of the position identifier.

In step 3, if the candidate position identifier meets a preset condition, it is determined that the candidate position identifier is the target position identifier of the slot identifier.

In a case that the candidate position identifier is obtained by fitting, the image processing module determines, by using a preset condition, whether the candidate position identifier is the target position identifier for positioning a slot identifier. For example, determining whether the line width of the candidate position identifier is equal to a preset width, or determining whether the candidate position identifier has a preset shape, and so on.

If the candidate position identifier meets the preset condition, it is determined that the candidate position identifier is the target position identifier for positioning the slot identifier.

In step 4, the position information of a position of the slot identifier in the target image is determined based on the target position identifier.

In a case that the target position identifier is determined, the image processing module positions the slot identifier based on a preset relative position relationship between the target position identifier and the slot identifier, that is, determines the position information of the position the slot identifier in the target image.

In a case that the position information of the position of the slot identifier in the target image is determined, the slot identifier may be analyzed to determine whether the current slot in the target image is the target slot 20 where the goods to be picked-up is stored.

If it is determined that the current slot is the target slot 20 for storing the goods to be picked-up, the image processing module requires to filter the goods identifier from the target image to determine the position information of the position of the goods to be picked-up in the target slot 20 based on the goods identifier.

In an implementation, the image processing module may filter the goods identifiers from the target image in the following steps 1 to 3.

In step 1, an image area located above the slot identifier in the target image is taken as an interesting area.

In an implementation, the goods identifier is arranged on the goods to be picked-up, and the position of the goods identifier is located higher than the slot identifier. Therefore, in this step, the image area located above the slot identifier is taken as an interesting area to filter the goods identifier. In addition, a size of the slot identifier may be obtained during the calculation process, and the size of the goods identifier may be determined according to the preset information.

In step 2, it is detected whether the interesting area includes an identifier with a preset shape.

In an implementation, as shown in FIG. 2, the goods identifier may be an identifier 22 with a preset shape. Therefore, in this step, it is detected whether the interesting area includes an identifier with a preset shape. The preset shape may be a circle, a triangle, a square or the like, and the shape of the goods identifier is not limited in the present disclosure.

The goods identifier may also be an identifier with a preset color, or may be a two-dimensional code, or the like. The specific form of the goods identifier is not limited in the present disclosure, and the goods identifier is searched for based on the actual specific form of the goods identifier.

In step 3, if the interesting area includes an identifier with a preset shape, the identifier is taken as the goods identifier.

In a case that the interesting area includes an identifier with a preset shape, the image processing module takes the identifier as the goods identifier.

Since the goods identifier is arranged on the goods, if the image processing module does not found the goods identifier, it indicates that no goods to be picked-up is stored in the target slot, and the current pickup is failed.

If the image processing module finds the goods identifier, the position determining module may determine the position information of the position of the goods to be picked-up in the target slot in the following steps 1 to 2.

In step 1, center position information of a center position of the goods identifier in the target image is determined.

The position determining module determines the position information of the center position of the goods identifier in the target image by image analysis and other technologies.

In step 2, the position information of the position of the goods to be picked-up in the target slot is determined based on the center position information and relative position information of a relative position between the goods identifier and the goods to be picked-up.

The goods identifier is preset at a preset position on the goods, so that the relative position information of the relative position between the goods identifier and the goods to be picked-up is known. Based on the center position information of the center position of the goods identifier in the target image and the relative position information of the relative position between the goods identifier and the goods to be picked-up, the position information of the position of the goods to be picked-up in the target image can be determined, and then the position information of the position of the goods to be picked-up in the target slot can be determined based on a transformation relationship between the image coordinate system and geographic coordinate system.

In an implementation, the goods identifier may also be arranged at any position of the goods. In this case, the goods identifier may be a two-dimensional code, and the two-dimensional code stores the relative position information of the relative position between the goods identifier and the goods to be picked-up. The position determining module may obtain the relative position information of the relative position between the goods identifier and the goods to be picked-up by decoding the goods identifier.

In a case that the position determining module determines the position information of the position of the goods to be picked-up in the target slot, the pickup robot 100 may pick up the goods to be picked-up from the target slot by the pickup component based on the position information.

The pickup component 130 may be a telescopic fork on the pickup robot 100.

In the above embodiment, the target slot where the goods to be picked-up is stored and the position information of the position of the goods to be picked-up in the target slot can be accurately determined based on the slot identifier and the goods identifier, and the goods to be picked-up can be accurately picked up based on the determined position information, thereby effectively improving the success rate of pickup, thus facilitating improvement of the logistics efficiency of the logistics industries.

Corresponding to the above-described pickup robot 100, a pickup method is further provided according to an embodiment of the present disclosure, which is applied by the pickup robot 100 and can achieve the same or similar beneficial effects, so the repetitive parts will not be repeated.

Figure 3:
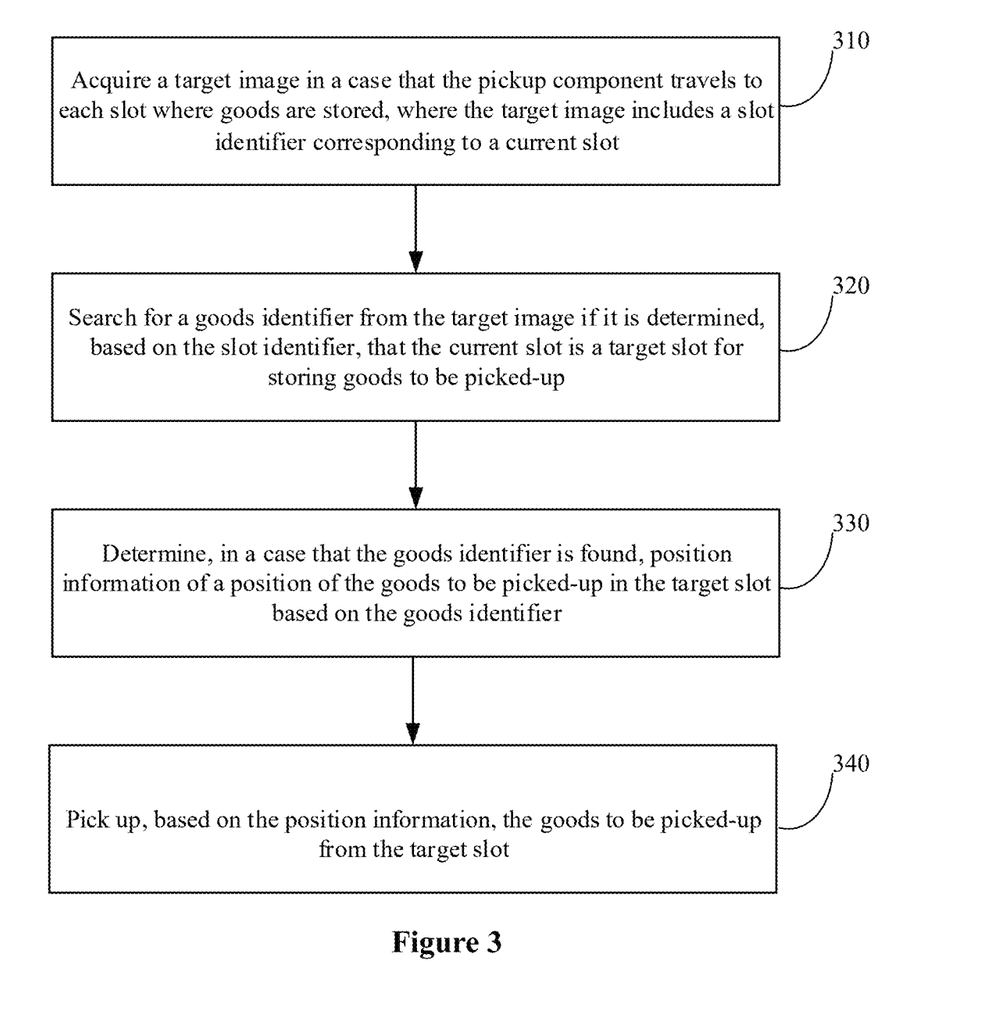
FIG. 3 shows a flowchart of a pickup method according to an embodiment of the present disclosure.

Specifically, as shown in FIG. 3, the pickup method in the present disclosure may include the following steps S310 to S340.

In step S310, a target image is acquired in a case that a pickup component travels to each slot where goods is stored. The target image includes a slot identifier corresponding to a current slot.

In step S320, if it is determined, based on the slot identifier, that the current slot is a target slot for storing goods to be picked-up, goods identifier is searched for from the target image.

In step S330, if the goods identifier is found, position information of a position of the goods to be picked-up in the target slot is determined based on the goods identifier.

In step S340, the goods to be picked-up is picked up from the target slot based on the position information.

In some embodiments, after acquiring the target image, the pickup method further includes:
performing binarization processing on the target image, and extract pixels with a preset gray value from an image obtained by performing the binarization processing;
performing fitting, based on the extracted pixels, to obtain a candidate position identifier of the slot identifier;
determining, if the candidate position identifier meets a preset condition, that the candidate position identifier is a target position identifier of the slot identifier; and
determining, based on the target position identifier, position information of a position of the slot identifier in the target image.

In some embodiments, the slot identifier is a two-dimensional code. The pickup method further includes following steps for determining whether a slot corresponding to the slot identifier is the target slot for storing the goods to be picked-up:
decoding the two-dimensional code based on position information of a position of the two-dimensional code in the target image to obtain identification information of the current slot corresponding to the two-dimensional code; and
determining, if the obtained identification information is the same as identification information of the target slot where the goods to be picked-up is stored, that the current slot corresponding to the two-dimensional code is the target slot.

In some embodiments, the determining the position information of the position of the goods to be picked-up in the target slot based on the goods identifier includes:
determining center position information of a center position of the goods identifier in the target image; and
determining, based on the center position information and relative position information of a relative position between the goods identifier and the goods to be picked-up, where the position information of the position of the goods to be picked-up in the target slot.

In an embodiment, a pickup robot is further provided according to an embodiment of the present disclosure, which includes a camera, a processor, and a pickup component. The processor includes an image processing module and a position determining module.

In the embodiment of the present disclosure, the pickup robot may acquire in advance the position information of the position of the target slot where the goods to be picked-up is stored. In this case, the pickup robot may directly travel to the position where the target slot is stored.

The camera may be configured to acquire a target image in a case that the pickup component travels to a target slot where goods is stored.

The image processing module is configured to filter goods identifier from the target image.

The position determining module is configured to determine, in a case that the goods identifier is found, position information of a position of goods to be picked-up in the target slot based on the goods identifier.

The pickup component is configured to pick up, based on the position information, the goods to be picked-up from the target slot.

The camera takes an image in a preset time interval. The above target image is an image acquired in a case that the pickup robot or the pickup part of the pickup robot travels to the target slot where the goods is stored. The image may include the slot identifier corresponding to the slot.

The slot identifier may be arranged at a lower part of each slot, such as a lower beam of the slot, and the slot identifier is used to identify the corresponding slot, for example, identify the ID number of the slot. In an implementation, the above slot identifier may be set as a two-dimensional code or the like.

After the camera of the pickup robot acquires the target image including the slot identifier, and before the image processing module searches for the goods identifier from the target image, the pickup robot may filter the slot identifier from the target image by the image processing module and analyzes the found slot identifier, to obtain the identification information of the slot. Then, the image processing module may acquire the identification information of the target slot where the goods to be picked-up is stored, and determine whether the identification information of the target slot is the same as the identification information of the slot in the target image. If the identification information of the target slot is the same as the identification information of the slot in the target image, it is determined that the slot in the target image is the target slot where the goods to be picked-up is stored.

The image processing module determines the position information of the position of the slot identifier in the target image. In an implementation, the image processing module may determine the position information of the position of the slot identifier in the target image in the following steps 1 to 4.

In step 1, binarization processing is performed on the target image, and pixels with a preset gray value are extracted from an image obtained by the binarization processing.

The image processing module performs binarization processing on the target image to obtain a binarized image.

In a case that the binarized image is obtained, the pixels with the preset gray value are extracted from the binarized image, that is, the pixels of a position identifier for positioning the slot identifier are extracted. As shown in FIG. 2, in an implementation, if the position identifier of the slot identifier is represented by a black frame 21 with a certain width, the image processing module extracts black pixels in this step.

In step 2, based on the extracted pixels, fitting is performed to obtain a candidate position identifier of the slot identifier.

In a case that the image processing module extracts the pixels of the position identifier, fitting is performed to obtain straight lines so as to obtain a black frame with a certain width. The black frame obtained in this step indicates a candidate position identifier, and further verification is required to determine whether the black frame is the target position identifier used to locate the slot identifier. The intersection of the fitted straight lines is a corner point of the position identifier.

In step 3, if the candidate position identifier meets a preset condition, it is determined that the candidate position identifier is the target position identifier of the slot identifier.

In a case that the candidate position identifier is obtained by fitting, the image processing module determines, by using a preset condition, whether the candidate position identifier is the target position identifier for positioning a slot identifier. For example, determining whether the line width of the candidate position identifier is equal to a preset width, or determining whether the candidate position identifier has a preset shape, and so on.

If the candidate position identifier meets the preset condition, it is determined that the candidate position identifier is the target position identifier for positioning the slot identifier.

In step 4, the position information of a position of the slot identifier in the target image is determined based on the target position identifier.

In a case that the target position identifier is determined, the image processing module positions the slot identifier based on a preset relative position relationship between the target position identifier and the slot identifier, that is, determines the position information of the position the slot identifier in the target image.

In a case that the position information of the position of the slot identifier in the target image is determined, the slot identifier may be analyzed to determine whether the current slot in the target image is the target slot where the goods to be picked-up is stored.

If it is determined that the current slot is the target slot for storing the goods to be picked-up, the image processing module requires to filter the goods identifier from the target image to determine the position information of the position of the goods to be picked-up in the target slot based on the goods identifier.

In an implementation, the image processing module may filter the goods identifiers from the target image in the following steps 1 to 3.

In step 1, an image area located above the slot identifier in the target image is taken as an interesting area.

In an implementation, the goods identifier is arranged on the goods to be picked-up, and the position of the goods identifier is located higher than the slot identifier. Therefore, in this step, the image area located above the slot identifier is taken as an interesting area to filter the goods identifier. In addition, a size of the slot identifier may be obtained during the calculation process, and the size of the goods identifier may be determined according to the preset information.

In step 2, it is detected whether the interesting area includes an identifier with a preset shape.

In an implementation, as shown in FIG. 2, the goods identifier may be an identifier 22 with a preset shape. Therefore, in this step, it is detected whether the interesting area includes an identifier with a preset shape. The preset shape may be a circle, a triangle, a square or the like, and the shape of the goods identifier is not limited in the present disclosure.

The goods identifier may also be an identifier with a preset color, or may be a two-dimensional code, or the like. The specific form of the goods identifier is not limited in the present disclosure, and the goods identifier is searched for based on the actual specific form of the goods identifier.

In step 3, if the interesting area includes an identifier with a preset shape, the identifier is taken as the goods identifier.

In a case that the interesting area includes an identifier with a preset shape, the image processing module takes the identifier as the goods identifier.

Since the goods identifier is arranged on the goods, if the image processing module does not find the goods identifier, it indicates that no goods to be picked-up is stored in the target slot, and the current pickup is failed.

If the image processing module finds the goods identifier, the position determining module may determine the position information of the position of the goods to be picked-up in the target slot in the following steps 1 to 2.

In step 1, center position information of a center position of the goods identifier in the target image is determined.

The position determining module determines the position information of the center position of the goods identifier in the target image by image analysis and other technologies.

In step 2, the position information of the position of the goods to be picked-up in the target slot is determined based on the center position information and the relative position information of a relative position between the goods identifier and the goods to be picked-up.

The goods identifier is preset at a preset position on the goods, so that the relative position information of the relative position between the goods identifier and the goods to be picked-up is known. Based on the center position information of the center position of the goods identifier in the target image and the relative position information of the relative position between the goods identifier and the goods to be picked-up, the position information of the position of the goods to be picked-up in the target image can be determined, and then the position information of the position of the goods to be picked-up in the target slot can be determined based on a transformation relationship between the image coordinate system and geographic coordinate system.

In an implementation, the goods identifier may also be arranged at any position of the goods. In this case, the goods identifier may be a two-dimensional code, and the two-dimensional code stores the relative position information of the relative position between the goods identifier and the goods to be picked-up. The position determining module may obtain the relative position information of the relative position between the goods identifier and the goods to be picked-up by decoding the goods identifier.

In a case that the position determining module determines the position information of the position of the goods to be picked-up in the target slot, the pickup robot may pick up the goods to be picked-up from the target slot by the pickup component based on the position information.

The pickup component may be a telescopic fork on the pickup robot.

In the above embodiment the target slot where the goods to be picked-up is stored and the position information of the position of the goods to be picked-up in the target slot can be accurately determined based on the slot identifier and the goods identifier, and the goods to be picked-up can be accurately picked up based on the determined position information, thereby effectively improving the success rate of pickup, thus facilitating improvement of the logistics efficiency of the logistics industries.

Corresponding to the above pickup robot, a pickup method is further provided according to an embodiment of the present disclosure, which is applied by the pickup robot, and can achieve the same or similar beneficial effects, so the repetitive parts will not be repeated.

Specifically, in an embodiment of the present disclosure, the pickup robot may acquire in advance the position information of the target slot where the goods to be picked-up is stored. In this case, the pickup robot may directly travel to the position where the target slot is stored. The pickup method in present disclosure can include the following steps:

acquiring a target image in a case that a pickup component travels to a target slot where goods is stored;

searching for goods identifier from the target image;

determining, in a case that the goods identifier is found, position information of a position of goods to be picked-up in the target slot based on the goods identifier; and picking up, based on the position information, the goods to be picked-up from the target slot.

In an embodiment, the target image includes a slot identifier corresponding to a current slot. The searching for goods identifier from the target image includes:

searching for the goods identifier from the target image if it is determined, based on the slot identifier, that the current slot is the target slot for storing the goods to be picked-up.

In some embodiments, after acquiring the target image, the pickup method further includes:

performing binarization processing on the target image, and extract pixels with a preset gray value from an image obtained by performing the binarization processing;

performing fitting, based on the extracted pixels, to obtain a candidate position identifier of the slot identifier;

determining, if the candidate position identifier meets a preset condition, that the candidate position identifier is a target position identifier of the slot identifier; and determining, based on the target position identifier, position information of a position of the slot identifier in the target image.

In some embodiments, the slot identifier is a two-dimensional code. The pickup method further includes following steps for determining whether a slot corresponding to the slot identifier is the target slot for storing the goods to be picked-up:

decoding the two-dimensional code based on position information of a position of the two-dimensional code in the target image to obtain identification information of the current slot corresponding to the two-dimensional code; and determining, if the obtained identification information is the same as identification information of the target slot where the goods to be picked-up is stored, that the current slot corresponding to the two-dimensional code is the target slot.

In some embodiments, the determining position information of a position of the goods to be picked-up in the target slot based on the goods identifier includes:

determining center position information of a center position of the goods identifier in the target image; and determining, based on the center position information and relative position information of a relative position between the goods identifier and the goods to be picked-up, the position information of the position of the goods to be picked-up in the target slot.

A storage robot is further provided according to an embodiment of the present disclosure, which includes: a camera, a processor, and a storage component. The processor includes an image processing module and a position determination module. The camera is configured to acquire a target image in a case that the storage robot travels to a slot where goods is to be stored. The image processing module is configured to filter a slot identifier from the target image. The position determining module is configured to determine, if it is determined that the slot identifier corresponds to the target slot, position information of a position of the goods to be stored in a target slot based on a position of the slot identifier in the target image. The storage component is configured to store the goods to be stored in the target slot based on the position information.

The storage component may be a telescopic fork set on the storage robot.

In the above embodiment, the target slot of the goods to be stored and the position information of the position of the goods to be stored in the target slot can be accurately determined based on the slot identifier and the goods identifier, and the goods to be stored can be accurately stored based on the determined position information, thereby effectively improving the success rate of storage, thus facilitating improvement of the logistics efficiency of the logistics industries.

Those skilled in the art can know that the pickup robot and the storage robot in present disclosure are only used to functionally distinguish the robots from the tasks. In practice, when a robot performs a pickup task, the robot may be regarded as a pickup robot, and when the robot performs a storage task, the robot may be regarded as a storage robot. A pickup part of the pickup robot and a storage part of the storage robot may be realized by the same part that can realize the storage and pickup functions. For example, a pick-store component includes the pickup component and storage component, the storage and pickup functions function can be realized through the pick-store component.

Corresponding to the above storage robot, a storage method is further provided according to an embodiment of the present disclosure, which is applied by the above storage robot and can achieve the same or similar beneficial effects, so the repetitive parts will not be repeated.

The storage method according to an embodiment of the present disclosure includes the following steps:
- acquiring a target image in a case that a storage robot travels to a target slot where goods is to be stored;
- searching for a slot identifier from the target image;
- determining position information of a position of the goods to be stored in the target slot based on a position of the slot identifier in the target image; and
- storing the goods to be stored in the target slot based on the position information.

A computer program product corresponding to the above method is further provided according to an embodiment of the present disclosure, which includes a computer-readable storage medium storing program codes. Instructions included in the program codes may be used to perform the method in the above method embodiments. For an implementation, reference may be made to the method embodiments, which is not repeated here.

The above description of the various embodiments intends to emphasize the differences between the various embodiments, and the similarities can be referred to each other. For the sake of brevity, details are not repeated herein.

Those skilled in the art can clearly understand that, for convenience and concise of description, the operation process of the system and device described above may refer to the corresponding process in the method embodiment, which will not be repeated in the present disclosure. In the several embodiments of the present disclosure, it should be understood that the disclosed system, device, and method may be implemented in other ways. The device embodiments described above are merely illustrative. For example, the division of the modules is only a logical function division, and there may be other divisions in actual implementations. For example, multiple modules or components may be combined or may be integrated into another system, or some features may be eliminated or not be implemented. In addition, the displayed or discussed mutual coupling or direct coupling or communication connection may be indirect coupling or communication connection through some communication interfaces, devices or modules, and may be in electrical, mechanical or other forms.

The modules described as separate components may or may not be physically separated, and the components displayed as modules may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a non-volatile computer readable storage medium executable by a processor. Based on this understanding, the technical solution of the present disclosure essentially or the part that contributes to the conventional art or the part of the technical solution may be embodied in the form of a software product, and the computer software product is stored in a storage medium, including several instructions which are used to cause a computer device (which may be a personal computer, a server, or a network device, etc.) to perform all or part of the steps of the methods described in the various embodiments of the present disclosure. The storage medium includes a U disk, a mobile hard disk, an ROM, a RAM, a magnetic disk or an optical disk and other medium that may store program codes.

The above are only preferred embodiments of the present disclosure, but the protection scope of the present disclosure is not limited thereto. Any person skilled in the art may easily think of changes or substitutions within the technical scope disclosed in the present disclosure, which should all fall within the protection scope of the present disclosure. Therefore, the protection scope of the present disclosure shall be subject to the protection scope of the claims.

The invention claimed is:

1. A robot, comprising: an image capture device, a processor, and a pick-store component,
   the robot is configured to perform at least one of a picking-up process and a storing process;
   during the picking-up process, the processor is configured to acquire a target image captured by the image capture device when the robot travels to a target slot where goods are stored, and filter a goods identifier from the target image;
   the processor is configured to determine, in response to obtaining the goods identifier through filtering, position information of a position of goods to be picked up in the target slot based on the goods identifier;
   the pick-store component is configured to pick up, based on the position information, the goods to be picked up from the target slot, and
   during the storing process, the processor is configured to acquire a target image captured by the by the image capture device when the robot travels to a target slot where goods is to be stored and filter a slot identifier from the target image;
   the processor is configured to determine, in response to obtaining the slot identifier through filtering, position information of a position of the goods to be stored in the target slot based on a position of the slot identifier in the target image; and
   the pick-store component is configured to store the goods to be stored in the target slot based on the position information;
   wherein during the picking-up process, for determining the position information of the position of the goods to be picked up in the target slot based on the goods identifier, the processor is further configured to:
      determine center position information of the goods identifier in the target image; and
      determine, based on the center position information and relative position information between the goods identifier and the goods to be picked up, the position information of the position of the goods to be picked up in the target slot.

2. The robot according to claim 1, wherein, during the pickup process, the target image comprises a slot identifier corresponding to a current slot, the processor is further configured to filter, in response to determining that the current slot is the target slot for storing the goods to be picked up based on the slot identifier, the goods identifier from the target image.

3. The robot according to claim 2, wherein the processor is further configured to:
perform binarization processing on the target image, and extract pixels with a preset gray value from an image obtained by performing the binarization processing;
perform fitting, based on the extracted pixels, to obtain a candidate position identifier of the slot identifier;
determine, if the candidate position identifier meets a preset condition, that the candidate position identifier is a target position identifier of the slot identifier; and
determine, based on the target position identifier, position information of a position of the slot identifier in the target image.

4. The robot according to claim 2, wherein the slot identifier is a two-dimensional code, and
the processor is further configured to:
decode the two-dimensional code based on position information of a position of the two-dimensional code in the target image to obtain identification information of the current slot corresponding to the two-dimensional code; and
determine, if the obtained identification information is the same as identification information of the target slot where the goods to be picked up is stored, that the current slot corresponding to the two-dimensional code is the target slot.

5. The robot according to claim 2, wherein for searching for the goods identifier from the target image, the processor is further configured to:
take an image area located above the slot identifier in the target image as an interesting area;
detect whether the interesting area comprises an identifier with a preset shape; and
determine, if the interesting area comprises an identifier with a preset shape, the identifier with the preset shape as the goods identifier.

6. The robot according to claim 1, wherein during the pickup process, the processor is further configured to:
determine, if the goods identifier is not found, that the goods to be picked up is not stored in the target slot.

7. A goods process method, comprising at least one of a picking-up process and a storing process, wherein the picking-up process comprises:
acquiring a target image in a case that a pick-store component travels to a target slot where goods is stored;
filtering goods identifier from the target image;
determining, in response to obtaining the goods identifier through filtering, position information of a position of goods to be picked up in the target slot based on the goods identifier; and
picking up, based on the position information, the goods to be picked up from the target slot, and
the storing process comprising:
acquiring a target image in a case that a storage robot travels to a target slot where goods is to be stored;
filtering a slot identifier from the target image;
determining position information of a position of the goods to be stored in the target slot based on a position of the slot identifier in the target image; and
storing the goods to be stored in the target slot based on the position information;
wherein, during the picking-up process, the determining position information of a position of the goods to be picked up in the target slot based on the goods identifier comprises:
determining center position information of a center position of the goods identifier in the target image; and
determining, based on the center position information and relative position information between the goods identifier and the goods to be picked up, the position information of the position of the goods to be picked up in the target slot.

8. The method according to claim 7, wherein, during the picking-up process, the target image comprises a slot identifier corresponding to a current slot,
the filtering goods identifier from the target image comprises:
filtering the goods identifier from the target image in response to determining that the current slot is the target slot for storing the goods to be picked up based on the slot identifier.

9. The method according to claim 8, wherein after acquiring the target image, the pickup method further comprises:
performing binarization processing on the target image, and extract pixels with a preset gray value from an image obtained by performing the binarization processing;
performing fitting, based on the extracted pixels, to obtain a candidate position identifier of the slot identifier;
determining, if the candidate position identifier meets a preset condition, that the candidate position identifier is a target position identifier of the slot identifier; and
determining, based on the target position identifier, position information of a position of the slot identifier in the target image.

10. The method according to claim 8, wherein the slot identifier is a two-dimensional code, and
the pickup method further comprises following steps for determining whether a slot corresponding to the slot identifier is the target slot for storing the goods to be picked up:
decoding the two-dimensional code based on position information of a position of the two-dimensional code in the target image to obtain identification information of the current slot corresponding to the two-dimensional code; and
determining, if the obtained identification information is the same as identification information of the target slot where the goods to be picked up is stored, that the current slot corresponding to the two-dimensional code is the target slot.

11. A computer-readable storage medium storing a computer program, wherein the computer program, when is run by a processor, executes a goods process method, the method comprising at least one of a picking-up process and a storing process, wherein the picking-up process comprises:
acquiring a target image in a case that a pick-store component travels to a target slot where goods is stored;
filtering goods identifier from the target image;
determining, in response to obtaining the goods identifier through filtering, position information of a position of goods to be picked up in the target slot based on the goods identifier; and
picking up, based on the position information, the goods to be picked up from the target slot, and the storing process comprising:
  acquiring a target image in a case that a storage robot travels to a target slot where goods is to be stored;
  filtering a slot identifier from the target image;
  determining position information of a position of the goods to be stored in the target slot based on a position of the slot identifier in the target image; and
  storing the goods to be stored in the target slot based on the position information;
wherein, during the picking-up process, the determining position information of a position of the goods to be picked up in the target slot based on the goods identifier comprises:
  determining center position information of a center position of the goods identifier in the target image; and
  determining, based on the center position information and relative position information between the goods identifier and the goods to be picked up, the position information of the position of the goods to be picked up in the target slot.

* * * * *